(12) United States Patent
Marchio

(10) Patent No.: US 10,155,579 B2
(45) Date of Patent: Dec. 18, 2018

(54) WIRELESS CONTROLLER

(71) Applicant: Douglas R. Marchio, Bangor, ME (US)

(72) Inventor: Douglas R. Marchio, Bangor, ME (US)

( * ) Notice: Subject to any disclaimer, the term of this patent is extended or adjusted under 35 U.S.C. 154(b) by 0 days.

(21) Appl. No.: 15/848,165

(22) Filed: Dec. 20, 2017

(65) Prior Publication Data
US 2018/0201354 A1 Jul. 19, 2018

Related U.S. Application Data

(60) Provisional application No. 62/445,803, filed on Jan. 13, 2017.

(51) Int. Cl.
| | |
|---|---|
| *B63H 25/02* | (2006.01) |
| *B63H 20/00* | (2006.01) |
| *B63H 25/42* | (2006.01) |
| *G05D 1/00* | (2006.01) |
| *G05D 1/02* | (2006.01) |
| *H01H 19/54* | (2006.01) |
| *B63B 35/00* | (2006.01) |

(52) U.S. Cl.
CPC ............ *B63H 25/02* (2013.01); *B63H 20/007* (2013.01); *B63H 25/42* (2013.01); *G05D 1/0016* (2013.01); *G05D 1/0022* (2013.01); *G05D 1/0206* (2013.01); *B63B 2035/008* (2013.01); *B63H 2025/028* (2013.01); *H01H 19/54* (2013.01)

(58) Field of Classification Search
CPC ........ B63H 25/02; B63H 20/07; B63H 25/42; G05D 1/0016; G05D 1/0022; G05D 1/0206
USPC .............................................................. 701/2
See application file for complete search history.

(56) References Cited

U.S. PATENT DOCUMENTS

| | | | |
|---|---|---|---|
| 7,575,491 B1 | 8/2009 | Martin | |
| 9,359,044 B2 * | 6/2016 | Langelaan | ............. B63H 21/17 |
| 2011/0201238 A1 * | 8/2011 | Rott | .................... B63B 35/7943 440/6 |
| 2017/0277180 A1 * | 9/2017 | Baer | ................... G05D 1/0038 |

* cited by examiner

*Primary Examiner* — Muhammad Shafi
(74) *Attorney, Agent, or Firm* — Anthony D. Pellegrini

(57) ABSTRACT

A wireless controller configured to operate the propulsion system of a vehicle, and in particular a watercraft, using intuitive, analog controls, whereby the controls allow for movement of the vehicle in forward, reverse, left, and right directions, at varying speeds, with the propulsion system in one embodiment having a pair of fixed motors each with a rotating propeller, with all directional and speed variations accomplished by operating each of the propellers in the same or opposite direction as the other propeller, each propeller operating at various speeds or no speed.

38 Claims, 15 Drawing Sheets

WIRELESS CONTROLLER

CROSS REFERENCE TO RELATED APPLICATION

This application claims the benefit of provisional application, U.S. Ser. No. 62/445,803, filed Jan. 13, 2017, by Douglas R. Marchio, which is hereby incorporated by reference.

BACKGROUND OF THE INVENTION

The general purpose of this invention is to provide a very stable, intuitive, and robust electric propulsion system for small boats and kayaks. Today's kayak/small boat fisherman often enjoys the use of a dc powered trolling motor to get to favorite fishing spots and to maneuver while fishing. Most of the time this propulsion system is adequate but somewhat slow. It is, however, generally underpowered for storm conditions and usually doesn't have enough battery capacity to last a long time. For long trips or for use in larger bodies of water, this is a serious problem.

Furthermore, to make the use of trolling motors more convenient, they are either operated by wired or wireless controllers. They offer a multitude of buttons (which the user has to look at often to be sure the right one is pressed) to digitally activate motor/prop actions. The result is often jumpy boat motion . . . not a smooth experience.

Most of the existing propulsion systems (especially those that use two motors/props) also have a multitude of cables that connect battery, controller receiver, control circuits and motors. Motor and system setup is often tedious. Steering systems and linkages continually require adjustment, especially if rudders are employed. The present invention seeks to avoid the foregoing problems.

SUMMARY OF INVENTION

The present invention solves the problems of the prior art devices. There are no steering linkages and all navigation is accomplished with moving one, easily understood knob on a wireless controller. To provide an ample amount of power, the invention uses 2 trolling motors, each having its own prop. Each trolling motor is connected to a Motor Mount Stub that simply clicks into a Main System Mount that straddles the gunnels of a boat (best located aft of the boat seat so as not to interfere with paddling when desired). As each Motor Mount Stub is clicked into place, the electrical connections to the Main System Mount occurs automatically. A lock pin keeps each Motor Mount Stub from coming out.

Trolling motors are supplied by the customer since they usually already have one. The only thing required by the system of the present invention is that the motors be the same model and that the maximum power consumption of each motor is less than 50 amps. This modular approach allows a customer to upgrade his propulsion system with new, improved motors when desired.

The Main System Mount usually stays in place, mounted on the boat. The mount is very simple, strong and adaptable to most boats. To get under way, one simply clicks each motor into opposite ends of the Main System Mount and then connects the battery (which also only takes one click). Dealing with each of these system elements separately minimizes the weight the user has to carry and install at any one time, and this procedure results in a very robust propulsion system (depending on the motors and battery that are chosen)

The Main System Mount has all the electronics built into it so there are no dangling cables or cable connections to be made other than just one cable connector click to connect the battery cable. The built in electronics include a radio control receiver, and 2 pulse width modulator circuits.

Steering and speed control is accomplished through the use of a system controller that varies the speed and direction of prop rotation of each motor to achieve the desired boat motion. No mechanical linkages or rudders are needed for steering. That is, when both props spin at the same speed and in the same direction, the boat is propelled in a straight line. Reducing the speed of one prop while increasing (or maintaining) the speed of the other prop causes the boat to turn in the direction of the slower prop. Reversing the rotation of one prop causes the boat to turn sharply, or even to rotate in place. And so on.

The system controller is held in one's hand (or simply worn around one's neck on a lanyard). Hence this is called a Wearable System Controller (however, it can also be mounted to a surface of the boat; its functionality does not depend on it being worn by the user). It has mostly analog style controls which are much smoother than digital buttons. All of the boat navigation commands are evoked with the use of a single knob, called the NAV knob. The NAV knob may be shaped like a boat (though other designs are also contemplated) and slides forward and backward. Sliding the NAV knob forward from the neutral position (marked with a detent that one can feel) causes the boat to go forward faster. To change course, the NAV knob is simply twisted in the desired direction (i.e., twisted left to turn left, twisted right to turn right). The more the NAV knob is turned, the sharper the boat is turned. To go in reverse, the NAV knob is pulled back from the neutral position detent. The further the NAV knob is pulled back, the faster in reverse the boat goes. For steering in reverse, one points/twists the "stern" portion of the NAV knob in the desired direction. The more the NAV knob is turned, the tighter the boat turns in reverse.

To maintain a certain speed and direction, the NAV knob is left alone. It will stay in place via friction at whatever setting the user last positioned it (along the front-to-back travel axis as well as along the left-to-right rotational arc). To adjust speed and/or direction, the NAV knob is simply pushed and twisted accordingly, as described above. The user never has to look down to see if a correct button is being pushed, as the single NAV knob indicates speed and direction simply by feel. This feature will be handy while traveling across larger bodies of water, while trolling and tending to fishing tackle at the same time (with the ability to make changes in course without changing speed).

There are three special purpose buttons on the system controller for non-navigational purposes. There is a power button (or switch). Turning the power button off stops the motors. Turning the power back on restarts the motors at their last setting. This is handy when one is trolling and wants to stop to play a fish.

The remaining two special purpose buttons are useful when fishing with the motors operational but stopped in neutral. There is a SpinCW ("spin clockwise") and a SpinCCW ("spin counter-clockwise") "momentary" buttons that will spin the boat when pushed and held down. Releasing the button cancels the operation. This allows the user to control boat orientation while fishing in a fixed spot without having to instruct the boat to go forward or backwards.

The Wearable System Controller houses a computer chip containing all the control programs used to control the operation of the motors. The program also features built-in soft change action between extreme command changes like going from forward to reverse. The result is that controlling the boat is very smooth. The sliding, analog NAV knob is connected to a modern version of a slide potentiometer called a SoftPot. Traditional versions of a slide potentiometer are not waterproof. The use of a SoftPot, however, allows the controller to be waterproof.

The present invention has required the creation of a unique x,y controller, which can be used in many other applications other than dual motor/propeller boat propulsion systems, as discussed in more detail below.

Another benefit of using two trolling motors to power the boat is to get more thrust when needed. The heavy DC motors under the water also aid in boat stability through their combined low center of gravity. Surprisingly, using two motors will not use significantly more power than using a single motor. To make longer trip times possible on the water, an optional battery that is much longer lasting and that puts out about 2 volts more than a regular 12 volt deep cycle marine battery can be used. Use of the 14.8 volt battery allows one to get about 30% faster prop speeds and consume less power while at cruising speed of about 4 MPH. It also allows the boat to go faster, if needed, up to the max optimum hull speed for displacement boat hulls. Tests indicate that the current consumption at the 4 MPH cruising speed is not too much higher than the current needed for one motor to maintain the same speed. It is noted that these tests used 55 ft/lb trolling motors that were purposely oversized for the test boat; this also helped save current. For DC trolling motors, it is commonly known that one gets most of the thrust at the mid-current setting (80% of max thrust is achieved with at about the 50% current setting). So at the 50% current setting the test boat was able to maintain a 4 MPH cruising speed. The dual motor configuration also provides safety redundancy; even if one motor fails, there remains another motor to assist with getting back to shore.

The present invention discloses a boat propulsion system that has necessary power, is easy to set up, provides an efficient cruising speed with the higher voltage battery option, and is smooth and easy to use. Its modularity also allows affordable partial upgrades.

Lots of tests with one trolling motor led to the conclusion that more power and thrust were needed, together with a steering method that was more responsive and that didn't depend on linkages that go out of adjustment. Two trolling motors were therefore employed. A control system that used PWM to conserve current consumption was used. 80% of a dc motor's max thrust could be reached at half the max current, so this became the power goal.

The initial tests of the steering logic was with the commercially available PWM controller for two motors but used two knobs/potentiometers. Two summers were spent figuring out what motor control actions would cause the steering and speed needed for smooth boat control. Using two knobs was found to be too confusing. The challenge was to find a way to control the navigation of a boat with only one knob. After dismissing the joystick solution because of inability to pack the steering instructions over the arc of stick deflection, it was considered to locate a slide potentiometer close to a rotary pot so one handed operation might be possible. While it is possible, a waterproof slide potentiometer had to be found. The preferred embodiment was the SoftPot. Then it was discovered that a rotary pot for steering could be mounted on a sliding carriage that would slide a wiper across a SoftPot; and that only one knob would have to be used to both move the sliding carriage and rotate the rotary pot (SoftPot for speed control and the rotary pot for steering). The electronics enclosure could be made as part of the slide assembly and could also provide a surface for the SoftPot wiper to wipe against. The idea of using a boat shaped knob would make use of the controller even more intuitive. Further ideas—a second wiper (or multiple wipers) could be used to provide tactile instructions of where neutral is located on the SoftPot and where optimum current consumptions limits are.

The two year testing process showed that a simple way to mount and unmount the motors and battery without a tangle of wires was desirable. In fact the testing showed that a custom, higher voltage and lighter battery needed to be developed to get the most speed efficiency out of the dc motor trolling motors.

A patent search resulted in the retrieval of the U.S. Pat. No. 7,575,491. Here is why the present invention offers a superior dual motor propulsion system over the '491 patent.

The '491 patent has a joystick that controls the boat direction in a linear manner. The joystick is pushed in the intended direction of travel . . . in a linear manner with the 2 motors. The present solution interfaces with a program to control the motors in a non-linear manner. The behavior of the motors was experimentally determined with a boat on the water and is the basis of the program steering logic. For instance, the '491 Patent accomplishes a tight turn to the right by reversing the right motor and rotating the left motor in a forward rotation. The present invention, through experimenting, is more efficiently done by shutting off the left motor and running the right motor in reverse. Even the way the user evokes a tight turn is far different. The '491 patent has the user deflect the joystick to a certain angular position. The present invention is more fool proof since joystick deflection angles were determined to be too small and too sensitive (the small deflection angle does provide not enough resolution to program the many changes needed for smooth motor control). The present invention simply uses a single knob shaped like a boat to control boat steering and speed. If one wants the boat to go forward simply push the boat forward (the further forward the knob is pushed it the faster the boat goes; the current linear SoftPot used is 2" long to achieve the needed resolution.) If at the same time one wants to steer in another direction, one just has to twist the boat knob in the direction of desired steering. In still water, if one wants to correct the orientation of the boat, the present invention has a true pivot function activated by special buttons. The '491 patent only has a hard right or left turn.

The '491 patent varies motor speed proportional to joystick deflection. The slider of the present invention varies speed in a much smoother fashion while the joystick deflection is again too sensitive. The control of the present invention is analog while the '491 patent's is digital, meaning the present invention has more potential to offer smoother controls. It also eliminates the erratic movements caused by bumping the joystick.

The '491 patent claims a cruise control which doesn't have a way to increment the speed or direction. The knob of the present invention remains in the last set position until it is changed (or increment it) . . . hence it is an automatic form of cruise control with incremental changes that are intuitive.

The present invention also uniquely offers an Optimize feature that keeps the motors operating at the most efficient thrust vs amperage draw. And it is user adjustable depending on motor, battery, etc.

The controller is wireless and can be worn on the user's body via lanyard, wriststrap, or whatever. It can also be mounted on the boat or on another accessory. Only a wired controller is described in the '491 patent.

The behavior of the motors to affect steering and direction of a boat is dependent also on where the two motors are mounted on the boat. The present invention creates motor control values through empirical experiments and thus the motor control logic is more flexible to accommodate different motor locations than the '491 patent describes.

The present invention has a soft shift of each motor's rotational direction so as not to stress the motors and mounts. The '491 patent is silent in this feature.

Changing prop pitch may be incorporated as needed in the future

Motor Mount Stubs that are quickly installed with automatic electrical connection are included in the present invention.

The system controller solution is waterproof, which meets the IP67 standard.

Other advantages: the watercraft can still be paddled; floats can be attached to each motor shaft (above each motor) to act as pontoons for additional stability if needed; the motors can be easily lifted separately.

It is to be understood that the foregoing and following description of the invention is intended to be illustrative and exemplary rather than restrictive of the invention as claimed. These and other aspects, advantages, and features of the invention will become apparent to those skilled in the art after review of the entire specification, accompanying figures, and claims.

DESCRIPTION OF THE DRAWINGS

FIG. 10C—A perspective partial top view of one embodiment of the wireless controller, showing the Feeler Strip on the top surface of the slider (with the NAV Knob removed).

DETAILED DESCRIPTION OF PREFERRED EMBODIMENT OF INVENTION

Figure 1:
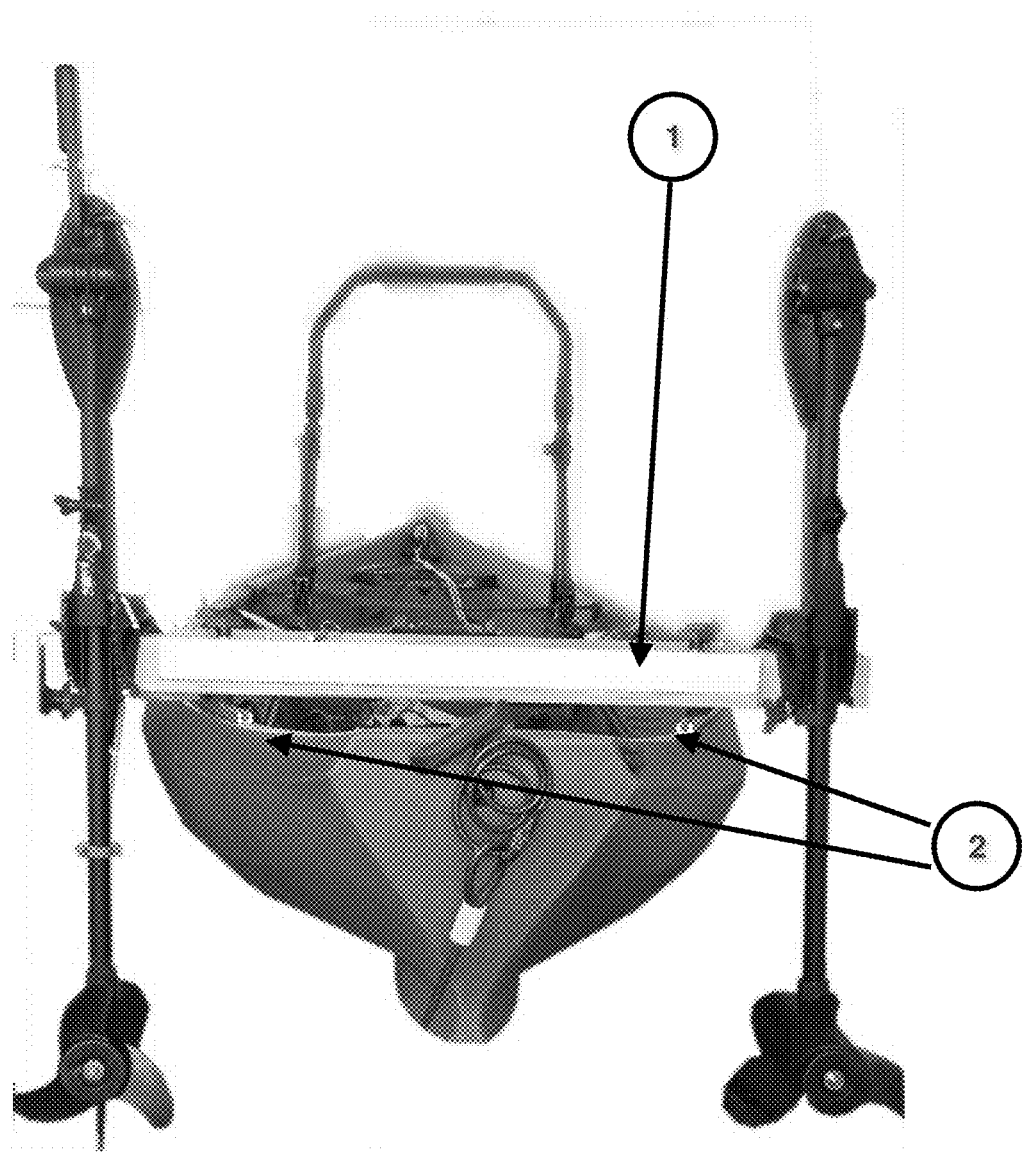
FIG. 1—Typical end view of fishing kayak with Propulsion System installed.

The present invention is comprised of the following elements: a Main System Mount, a Wearable System Controller, a power supply, and optionally a quick connect battery cable.

The Main System Mount is the principal support structure for the twin motors. This structure straddles the boat gunnels and is attached thereto. It contains the radio receiver for communicating with the wireless controller, and two pulse width modulator motor controllers. The Main Mount System comes with two quick change motor mount stubs (each is inserted into an opposite end of the Main System Mount). A user clamps one trolling motor onto a Motor Mount Stub in the same manner as if they were attaching it to the stern board, using the factory provided mounting clamp. Each end of the Main System Mount is designed to receive a Motor Mount Stub in one easy motion.

The Wearable System Controller has a radio transmitter and circuitry to communicate wirelessly with the Main System Mount. It works with rechargeable lithium batteries.

The main power source for the motors/props is a customer supplied 12 v DC battery (deep cycle version). An optional 14.8 v lithium-ion battery is offered, 120 AH to get increased motor performance as described above.

The optional quick connect battery cable is used so that the battery can be located anywhere on the boat to achieve the best boat balance. It is impossible to get polarity wrong using the quick connect means.

The invention's control of propeller rotation direction and the speed of two powerful DC motors causes precise speed and steering movements. The high resolution steering and speed control allows much more detailed motor control logic to be embedded over the travel of the rotary and slide potentiometers (this travel distance of the potentiometers is much greater than is possible in a joystick). The invention provides a smooth analog feeling, not attainable using bumpy digital button pushes. There is no need for extra steering mechanisms such as rudders.

The '491 patent has a joystick that controls boat direction in a linear manner in the pushed direction . . . in a linear manner with two fixed motors/props. Since a joystick has a limited arc of deflection, typically between 30 to 30 degrees from the neutral position, it has much less resolution to pack in motor control information compared to the use of a rotary potentiometer (160 degrees of rotation CW or CCW from neutral position) together with a slider potentiometer (SoftPot with 2 inches of travel, or 1 inch from neutral). Hence, using a joystick, the number of resulting boat movement changes cannot be as great as the solution provided by the present invention and would be more sensitive to stick movement. Boat motion will therefore be much smoother.

Using steering as an example, the boat can be instructed to go from a wide to a medium to a tight turn with the rotary potentiometer. The joystick example goes from a wide turn directly to a tight turn for a full joystick deflection. The solution provided by the present invention interfaces with a program to control the motors in a non-linear manner. The behavior of the motors was experimentally determined with a boat on the water and is the basis of the program logic. The steering logic is further unique since it gives fine steering control without having to mechanically swivel each motor.

The present invention uses a single boat shaped knob, called the NAV knob, to control the boat movements as described above. This feature is at the core of the unique approach of using one main knob to control the controllable first feature—the speed of the boat—and the controllable second feature—the steering of the boat—simultaneously. It is made possible by mounting this knob (connected to a rotary potentiometer which serves as the boat steering wheel) on top of a sliding carriage that has a integrated wiper that travels over a linear strip potentiometer that controls speed in Forward or Reverse (this potentiometer slider (or SoftPot) controls speed in forward and reverse depending which way the knob is being slid.

A small, flexible cable attaches the rotary potentiometer to the controller circuitry. To control the boat one simply grabs the NAV knob and pulls the attached sliding carriage to control speed (the controllable first feature), and simultaneously twists the NAV knob to achieve steering (the controllable second feature). The controller box can also house a power switch and spin switches (or other switches in the future) in easy to reach locations when they are needed. The NAV knob doesn't have to be the shape of a boat and can be made smaller or larger depending on user preferences.

Some current dual-motor driven boats have larger joysticks that are fixed mounted on the boat. The joystick deflection angle may be large enough to embed more motor control information. However, such large form joysticks would be difficult to "wear", if they could be "worn" at all. Other solutions include foot pedals to control each motor separately, limiting the user's position in the boat, as well as being far less intuitive than the NAV knob.

The waterproof system controller, the Wearable System Controller, is wireless, relatively small, and is still able to contain analog devices for making steering and speed adjustments. This is a unique combination and makes the user interface extremely intuitive.

Most wireless boat motor drive controllers (even for single trolling motor) use button controls, or a combination of 1 knob and buttons, for steering and speed control. This is probably since this approach is not expensive, is easier to program, and can be readily made waterproof. It is also easier to make and program a controller with two separate controls for steering and speed. Using two rotary potentiometers to control a boat, however, is fairly hard to do for the pilot.

The system controller of the present invention can provide tactile feedback (which has been reputed to be better than visual lights) when the user slides the NAV knob assembly (speed control) out of the most efficient speed range. The NAV knob slide assembly is equipped with an additional wiper. The surface that the wiper rubs against is customizable with speed bumps by the customer with a mountable Feeler Strip. With an amp meter customers can determine where current consumption is going up too much (for their motor and battery configuration) and modify the tape at this point. This wiper also provides feedback of the Neutral Point by a factory installed notch. Mountable feeler tape may be located under the whole travel of the slider where portions can be customized.

The Wearable System Controller is so easy to use one can fish and control the boat at the same time. This is important for sight fishermen who stand almost anywhere in the boat while fishing. Other wireless controllers that employ buttons are harder to use in this manner.

Friction cruise control. Simply leave the NAV knob in its last position. To change speed and/or direction, move/rotate the NAV knob from its last position. This is superior to the cruise control lock feature described in the closest, similar patent (engaging and disengaging the lock of a joystick would bump its position a little translating to a bump in boat motion).

The Wearable System Controller has additional features designed specifically to aid fishermen or photographers. While the boat is in neutral, the Spin buttons can momentarily spin the boat either CW or CCW while each respective button is being pushed.

The power on/off switch of the Wearable System Controller can be used to instantly disengage motor control. When turned back on, the last motor control motions are resumed. This can be very useful when stopping to play a fish hooked while trolling.

Trolling motors can be left attached to their Motor Mount Stubs when not in use. The Stubs are only 11 inches long. The motor clamps onto a 6" end-portion of the Stub. The other part of the Stub is later inserted into the female opening of an end of the Main System Mount (that is just outside the gunnel). Each motor can be carried separately and snapped into the Main System Mount (that can be permanently mounted to the boat) with a single motion and locked in place with a pin. The same motion automatically engages the electrical connections.

For maximum flexibility to interchange new motors the trolling motor's standard transom clamp mount is used to attach to the stub. Using the standard mount and not using the upper handle of the trolling motor for operation at first seems very redundant. But in emergencies (if a motor fails or the prop is damaged by hitting a rock), one could use the remaining trolling motor in a more manual manner to get home.

There are no dangling cables to manage except for a single cable that is snapped in to connect the battery. The rectangular shaped Main System Mount is used to actually contain and manage cables, electronics and plug in receptacles, resulting in an uncluttered deck.

An optional 14.8V battery can provide 30% faster propeller speed. This translates to faster top boat speeds approaching the theoretical Max hull speed. It also allows one to maintain cruising speed with much less current. This is especially true if larger trolling motors are used.

The propulsion system is modular. It can be upgraded, with either the motors or the batteries or both being replaced. The Motor Mount Stubs and the Main System Mount remains unchanged.

The Wearable System Controller user interface is intuitive for both left handed and right handed boat operators.

The Main System Mount is fastened as follows: two 12" long aluminum tracks are fastened on top of the boat's gunnels with hollow door fasteners (providing over 500 lbs of clamping force). It doesn't matter if they are parallel to the boat centerline, nor do they need to be level as this is hardly ever possible for most boat designs. These tracks house the hex heads of standard bolts with the threads up (two on each side of the boat). Rubber cylinders cap each bolt to act as levelers and shock absorbers before fastening the rectangular shaped tube of the Main System Mount. The scale of the Main System Mount can be varied depending on the size of the boat and motors. If the motors are very small and light, the motors can be more permanently (elimination of the Motor Mount Stubs) attached to the Maine System Mount. This would enable clicking the whole assembly (motors and Main System Mount) in one motion onto a receptacle that is part of the boat.

The kayak propulsion system has been primarily envisioned as an affordable, modular type system aimed at the needs of kayak/small boat fishermen. There is also a design variation that would make it more appealing to paddlers and other recreational boaters. The design eliminates the need for a Main System Mount or externally clamped on motors. Small, powerful motors can be put into a stream-lined enclosure that in turn is permanently mounted to the underside hull of boats. In this case the electronics that would otherwise go into the Main System Mount would be put into a waterproof compartment inside the boat. Another design is to make a special boat hull that will integrate the motors so that they wouldn't be noticed. It is done in a way so as to minimize drag, and does not catch on limbs or obstacles encountered in the water.

The feature that is at the core of the unique approach of the present invention of using one main knob to control the speed (the controllable first feature) and steering (the controllable second feature) simultaneously is made possible by mounting this knob (connected to a rotary potentiometer which serves as the boat steering wheel) on top of a slider that has a integrated wiper that travels over a linear strip potentiometer that controls speed in Forward or Reverse (this potentiometer slider (or SoftPot) controls speed in forward and reverse depending which way one is sliding it).

The arrangement of a rotary pot on an arm that slides over a linear potentiometer can be accomplished in many mechanical scenarios. And it can be done in a separate assembly that attaches to the controller or boat.

The controller can also be made with one rotary potentiometer and one slide style potentiometer (like the SoftPot) to make it waterproof. If these controls are placed close together, they would be somewhat easier to use than two knobs. Or two SoftPots located either in parallel or perpendicular to each other can be used. The preferred embodiment uses one knob to control both steering and speed since it provides the easiest and most intuitive user interface. Since a sealed rotary potentiometer and a SoftPot are used, the Wearable System Controller is waterproof.

There are lots of single motor trolling motor wireless controllers on the market. Almost all have button style user interface and can be hand held or worn at the end of a lanyard. They result in boat motions not as smooth or intuitive as the present invention controller.

Cruise control can be made more electronic and employ the use of an electronic hold button.

Motor attachment is very easy with no risk of crossing wires.

FIG. 1 shows the Main System Mount 1 as a crossmember comprised of a rectangular aluminum tube that mounts to and extends across the boat gunnels 2.

Figure 2:
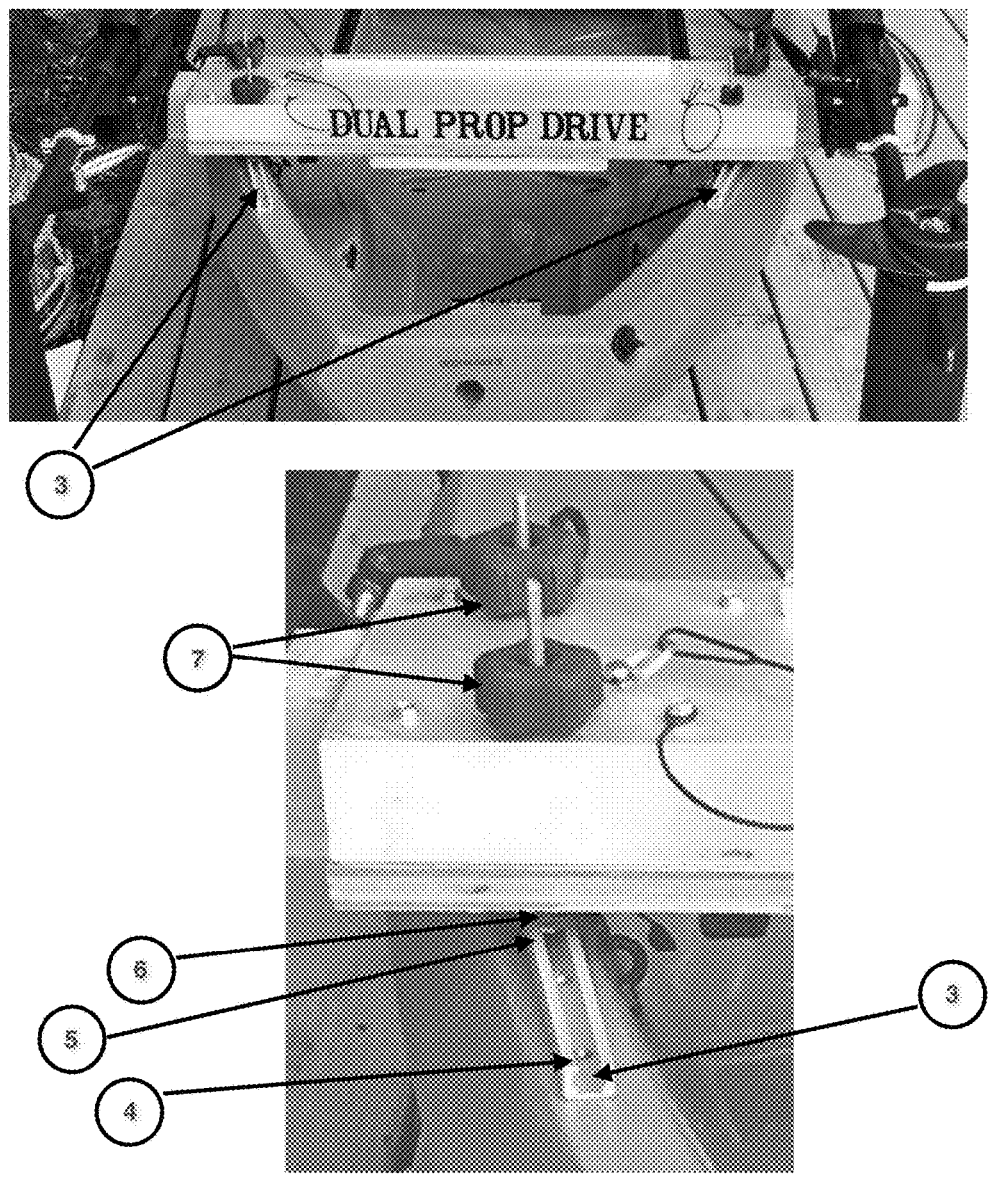
FIG. 2—How Main System Mount is installed.

FIG. 2 shows how the Maine System Mount is attached to the boat gunnels. Two 12" long, aluminum tracks 3 are fastened on top of each gunnel with hollow door fasteners 4 (providing a total of over 500 lbs of clamping force). It doesn't matter if they are parallel to the boat centerline, nor do they need to be level as this is hardly ever possible for most boat designs. These tracks house the hex heads of standard bolts 5 with the threads up (two on each side of the boat). Rubber cylinders 6 are placed on each bolt to act as levelers and shock absorbers before fastening the rectangular shaped tube of the Main System Mount with 4 threaded lock knobs 7. The location of the Main System mount should be far enough back in the boat to provide paddling clearance when paddling is desired. But the mount should be forward of the stern to give more responsive turning and be somewhat accessible from inside the boat if manual intervention is needed.

Figure 3:
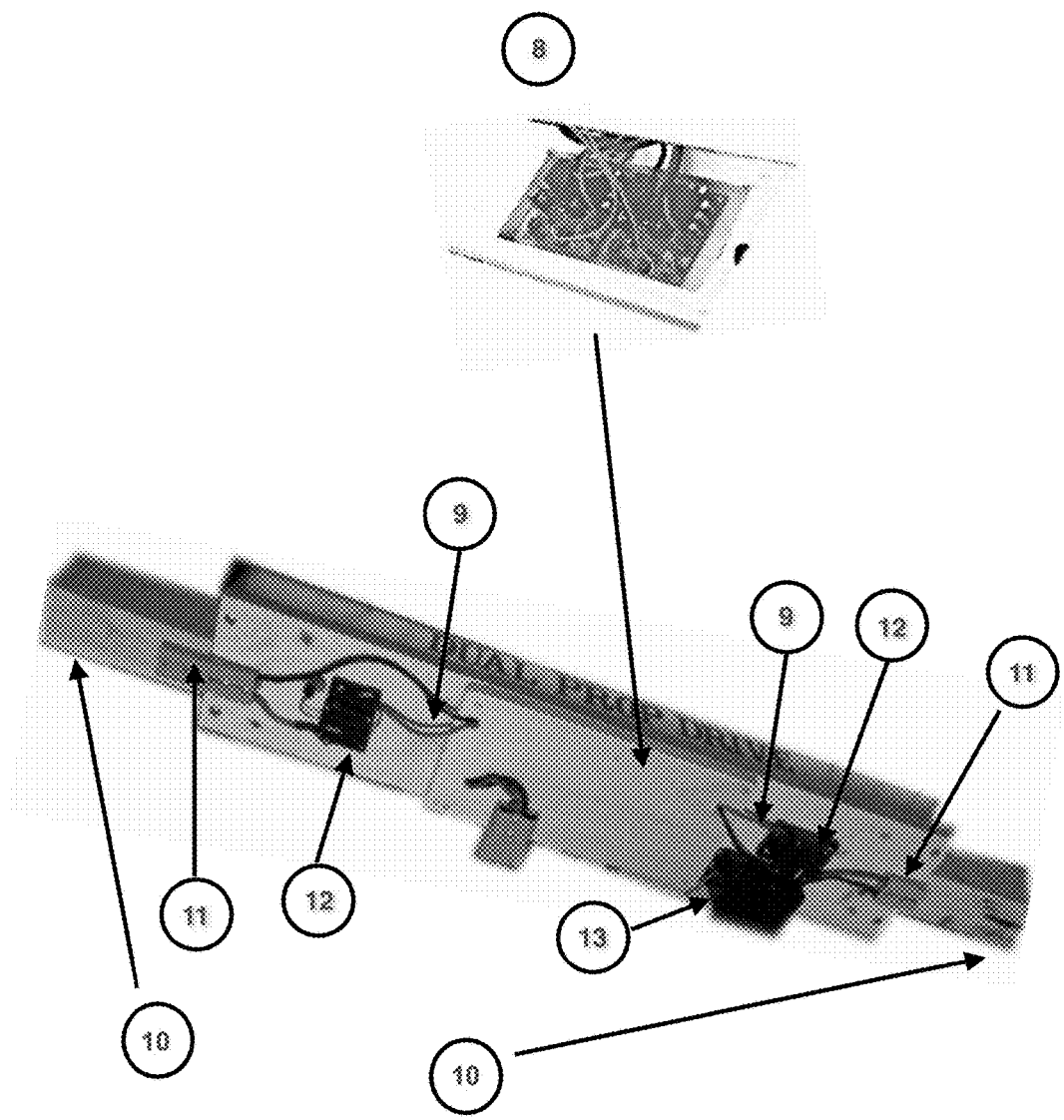
FIG. 3—Wiring Integration within the Main System Mount.
Figure 4:
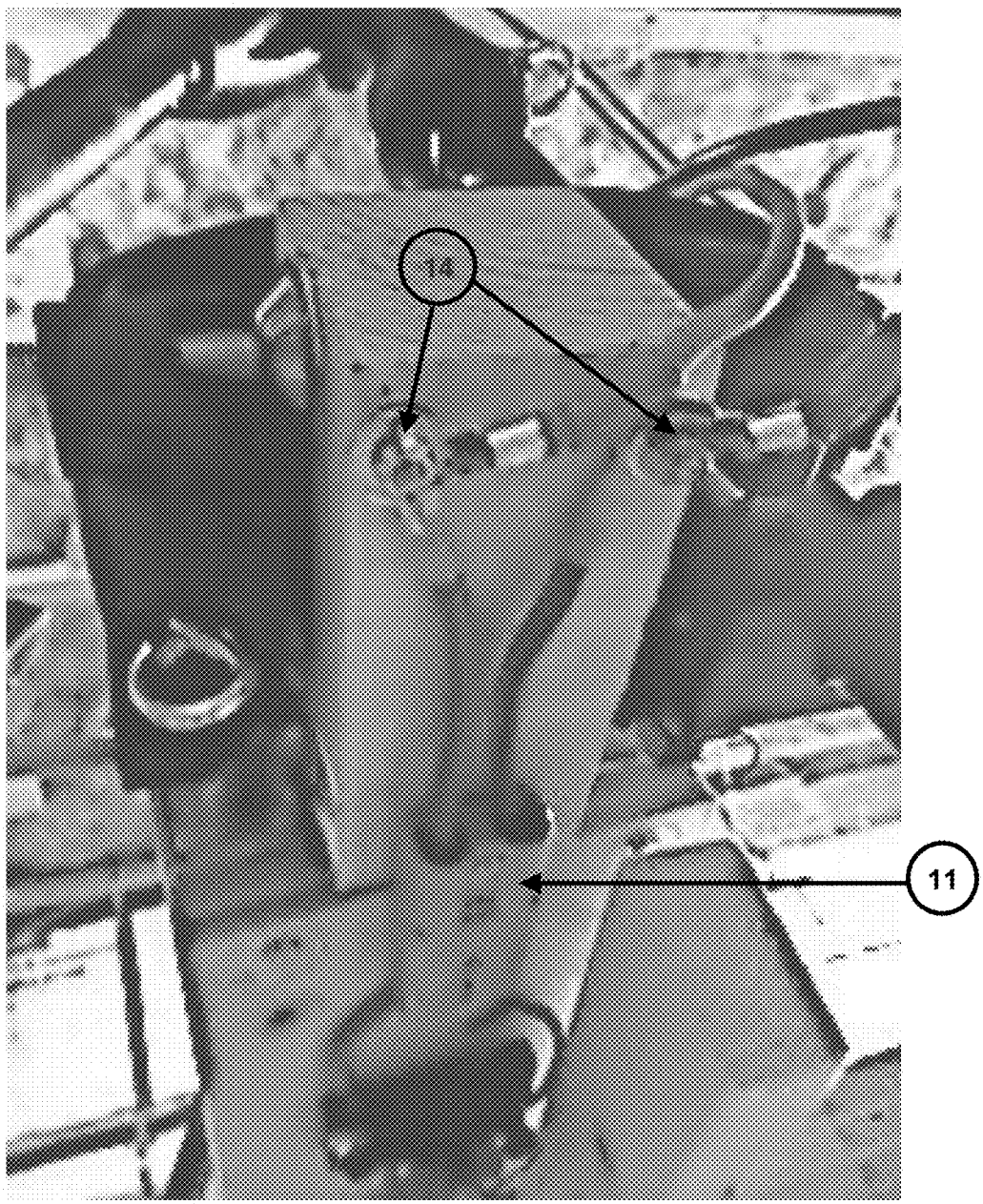
FIG. 4—Shows how the main power wires of the motor is connected to the lugs on each motor stub.

FIG. 3 shows wiring that is contained within or tightly attached to the rectangular tubing of the Main System Mount 62. The Pulse Width Modulation boards 8 are mounted inside the Main System Mount 62 in a sealed chamber. Power wires 9 run from them through overload cutout switches 12 on the outside (for re-setting), then through slip-in electrical connectors 11 to each Motor Stub 10. On the underside of the Main System Mount 62 a Radio Control (R-C) Receiver 13 receives signals from the Wearable System Controller. The R-C Receiver relays the signals to control the PWM currents to each motor via hard wires. This is shown more clearly in FIG. 4. Note that motor wiring simply attaches to lug studs 14 on the Motor Mount Stubs 66.

Figure 5:
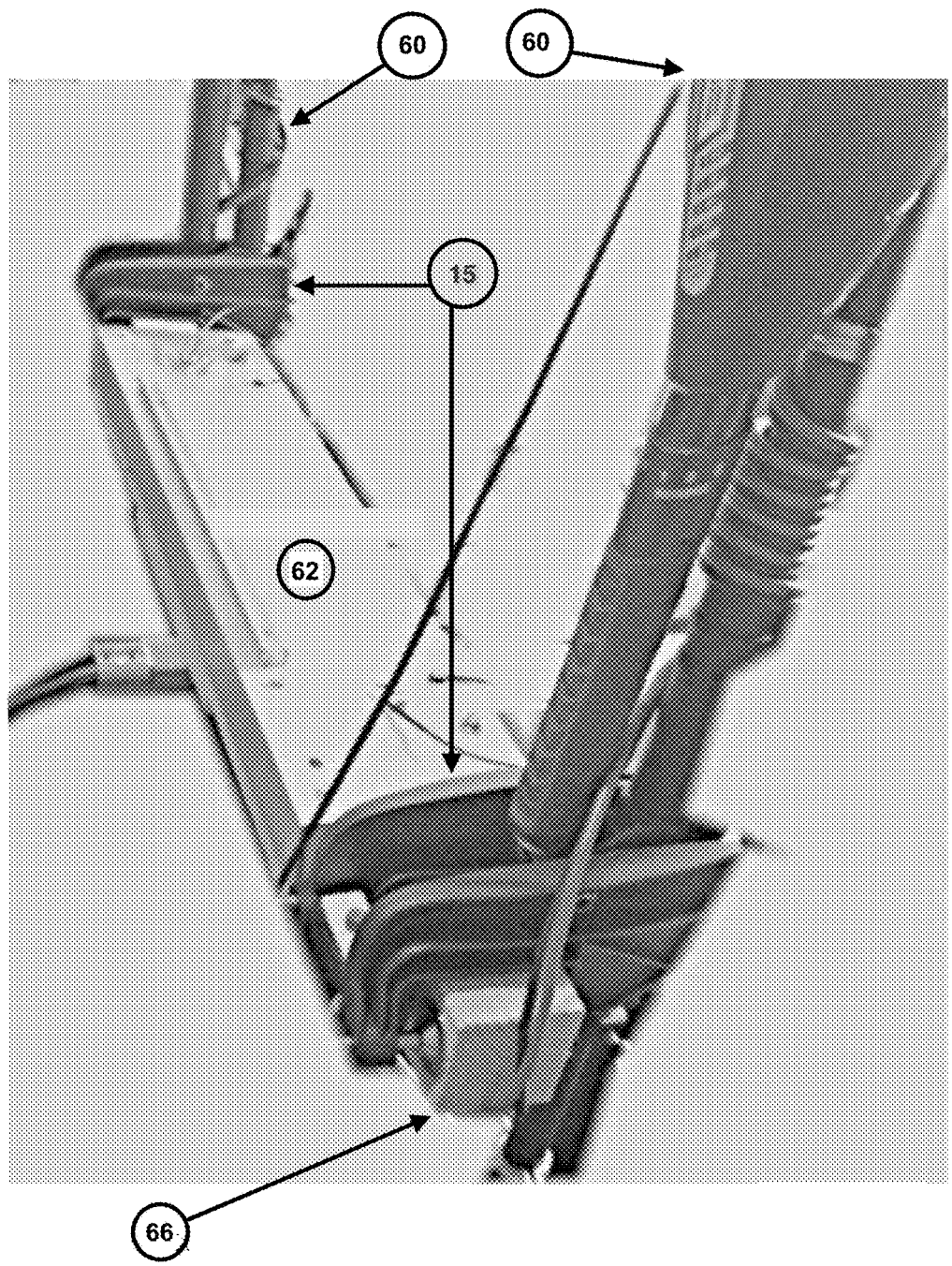
FIG. 5—Attachment of motors to motor stubs which are shown inserted into ends of rectangular tubing.

FIG. 5 shows how the boat operator "mechanically" connects a trolling motor 60 (of the same size up to 50 amp power consumption) to each Motor Mount Stub 66. This is usually done with the clamp 15 that comes with the trolling motor 60. The two power cords of each motor 60 are bundled so as not to flop around and connect to lug bolts 14 (see FIG. 4) under the Motor Mount Stub 66.

Figure 6:
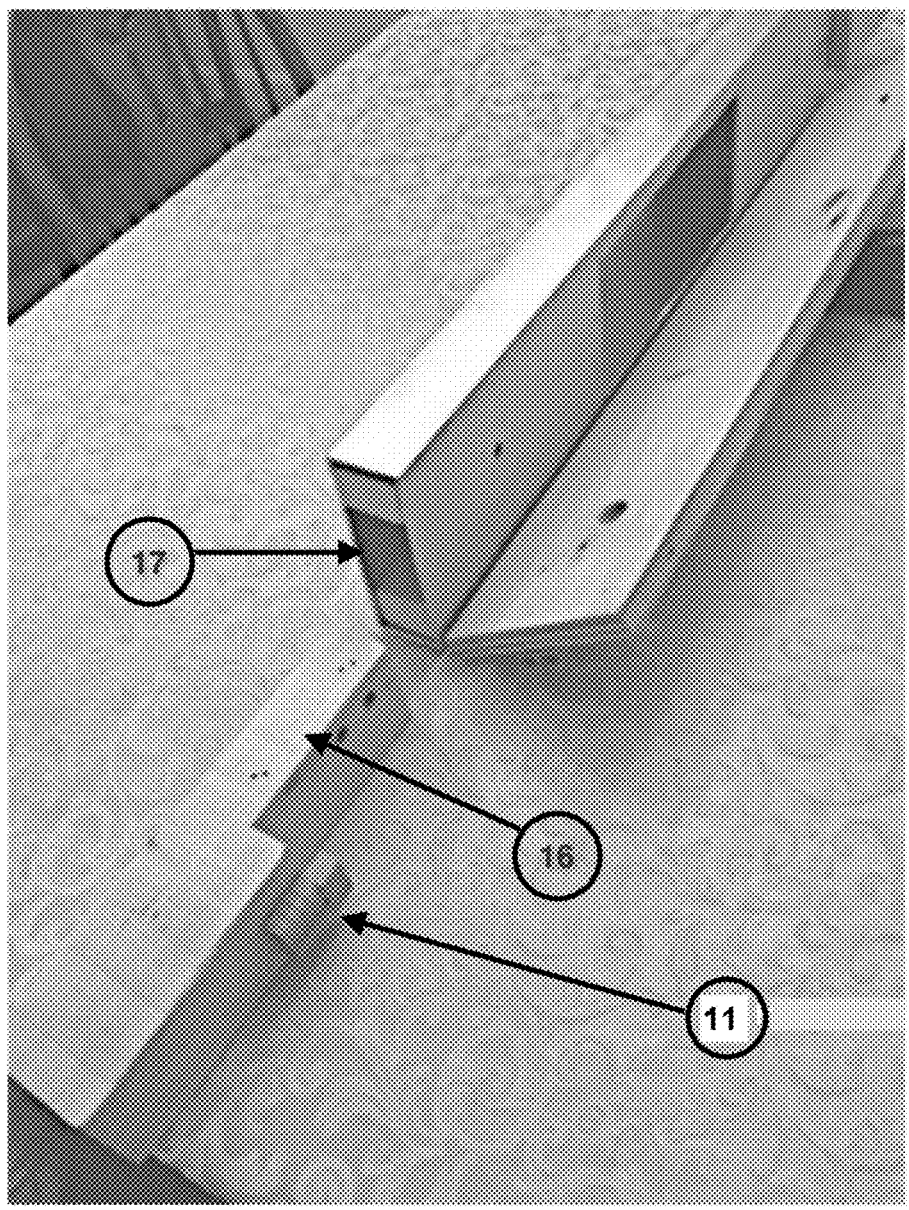
FIG. 6—Shows how the end of the Motor Stub is mated with the end of the Maine System Mount.
Figure 7:
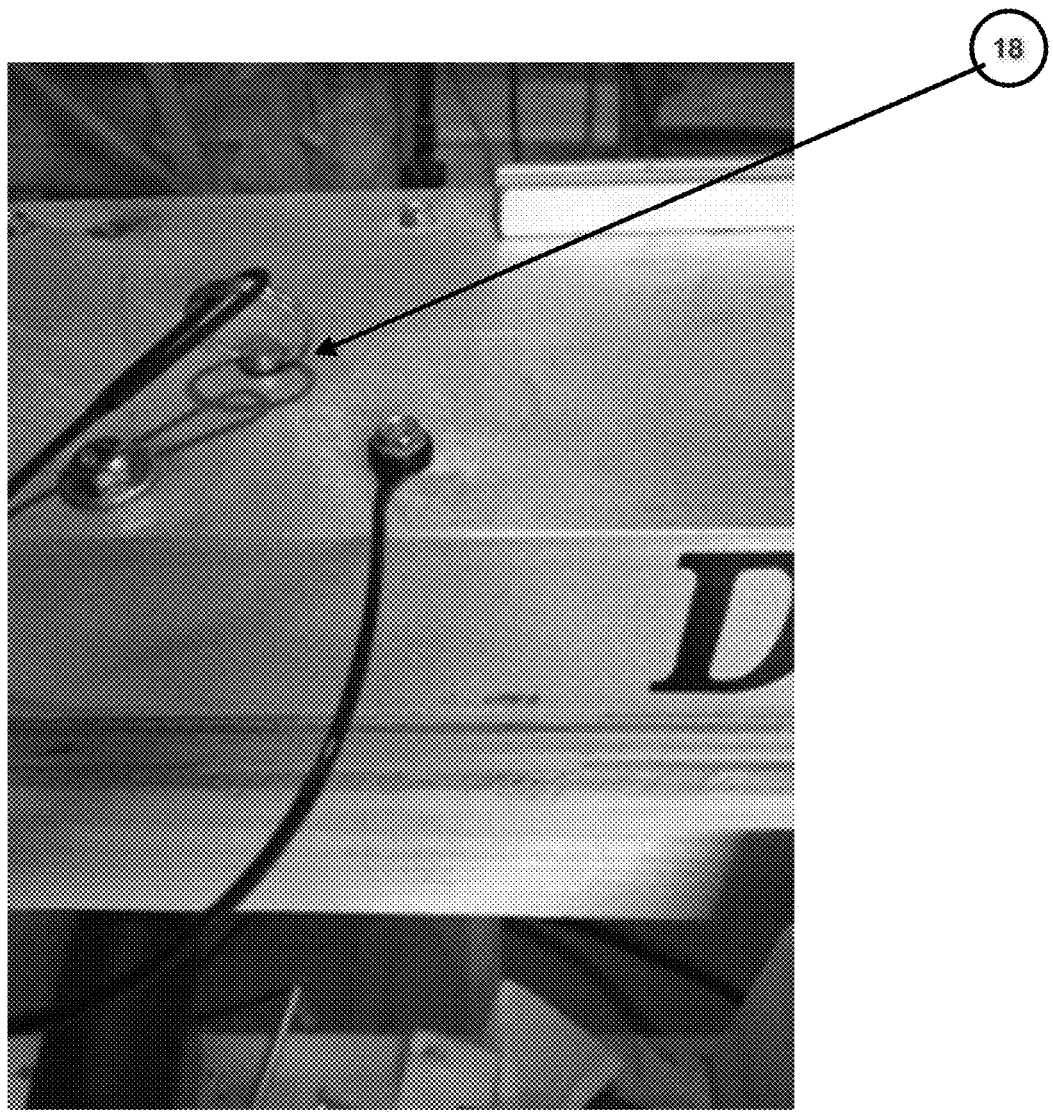
FIG. 7—Retaining pins hold the Motor Stubs in place.

FIG. 6 shows Element 16 of the Motor Mount Stub that extends out and is shaped to fit into the correct end 17 of the Main System Mount tube. Once inserted, a retaining pin 18 (see FIG. 7) holds the whole assembly in place. The electrical slip-in connectors mate together automatically as a result of this insertion (shown clearly in FIG. 4). The other trolling motor and Motor stub mates into the opposite end of the Main System Mount in a similar manner. The retaining pins and electrical connectors can be a bit off center so that one cannot confuse which motor mounts go on which end (if that becomes important).

Since each trolling motor is clamped on with its original clamp 15 it generally has a pivoting capability built-in to the design. From his/her sitting position, the boat operator can release and pivot each motor up (usually with a little rope) to avoid hitting shallow obstacles or to beach the boat.

Since most common and affordable trolling motors are 12 v, one can now connect a regular rechargeable 12 v battery to the Main System Mount via the supplied battery connector cable 19 (both polarity leads within 1 cable).

Figure 8:
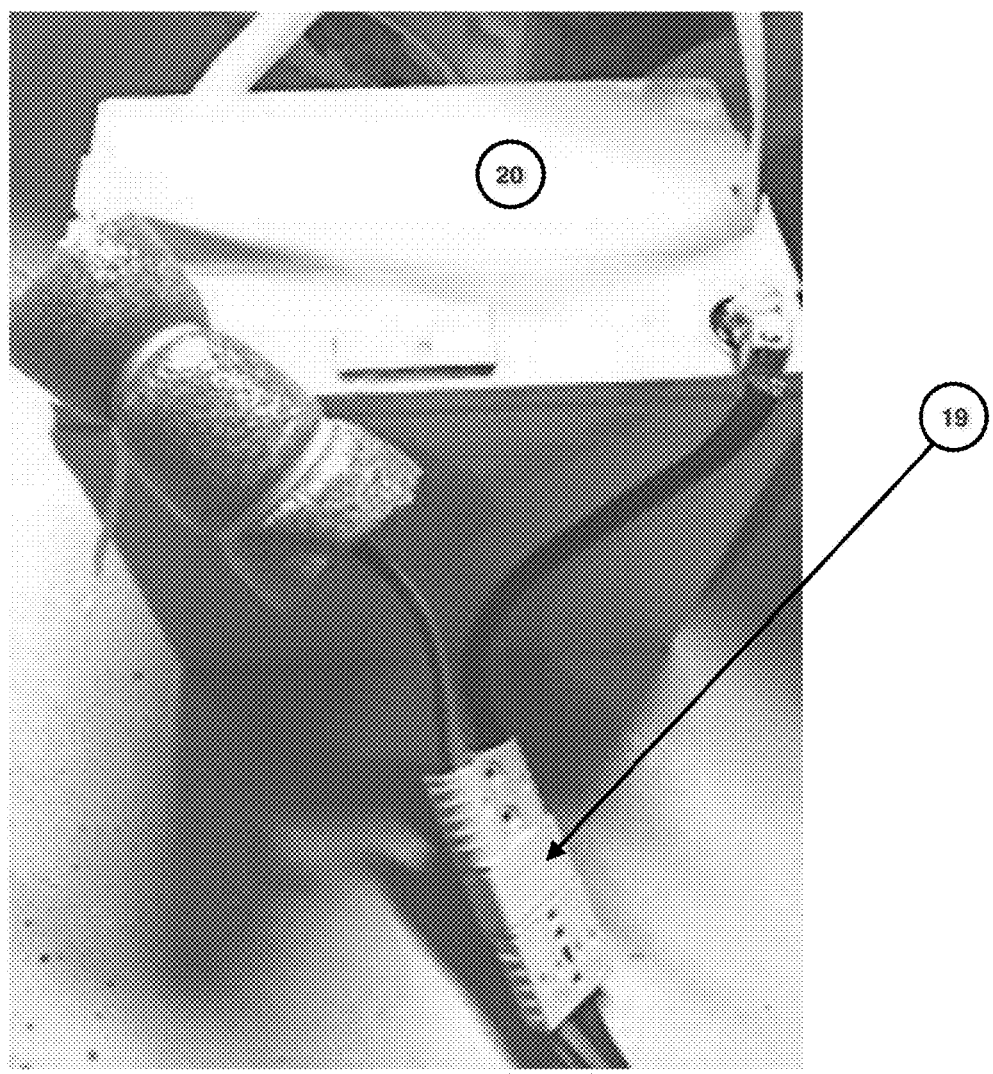
FIG. 8—Shows optional lithium 14.8 v battery with Battery Connector Cable.
Figure 9:
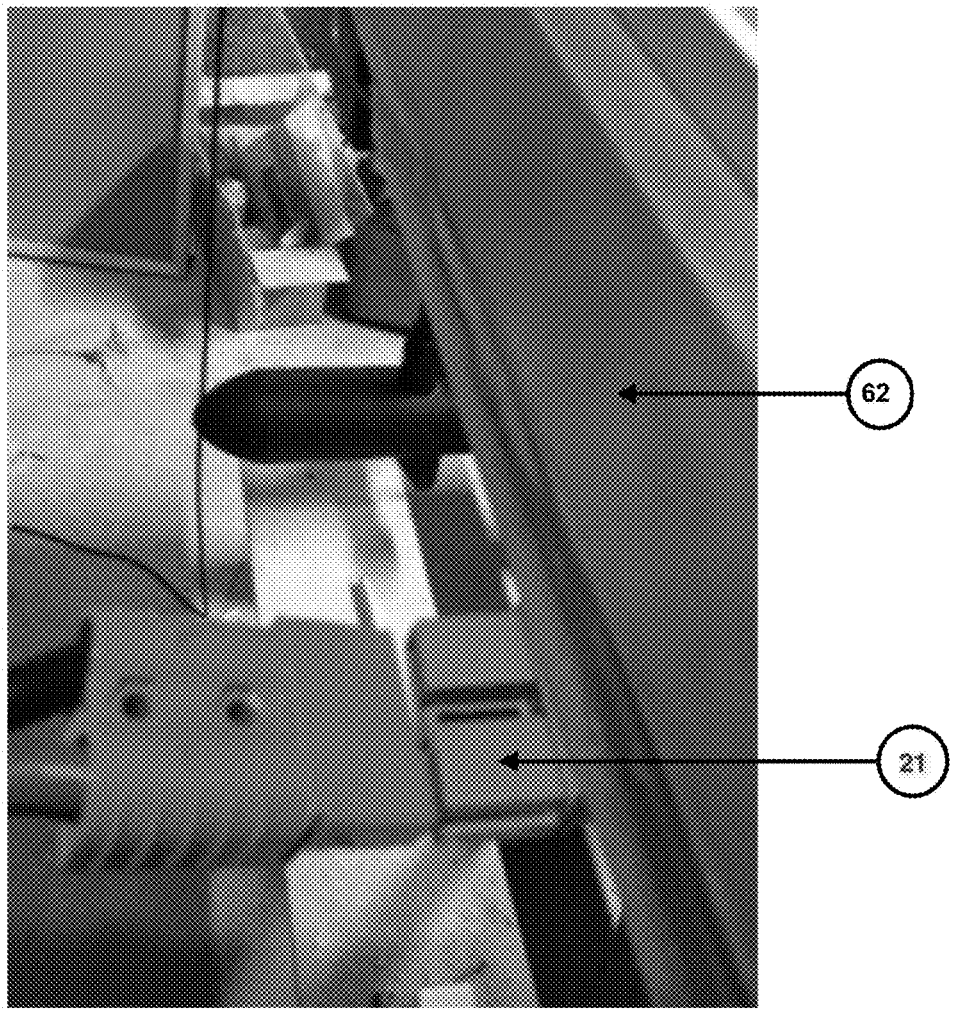
FIG. 9—Shows how the Battery Connector Cable slips into the mating receptacle on the Main System Mount.

FIG. 8 shows the optional lithium 14.8 v battery with Battery Connector Cable 19. This cable can always be left attached to the battery 20 since it has a special, slip in connector that protects and houses both the negative and positive wire ends. This end connector slips into a mating connector 21 (see FIG. 9) provided with the Main System Mount. It is easy to plug the battery in and polarity is always correct. To give about 30 percent more rpm of the trolling motor props, optionally the larger battery choice is offered. It has a nominal voltage of 14.8 v and is lithium-ion. It is much lighter and offers many other advantages over regular 12 v lead acid batteries. It will generally result in faster speeds, and longer boating trips. The Main System Mount can accommodate even higher voltage batteries with little or no modification as future motors are developed.

Figure 10:
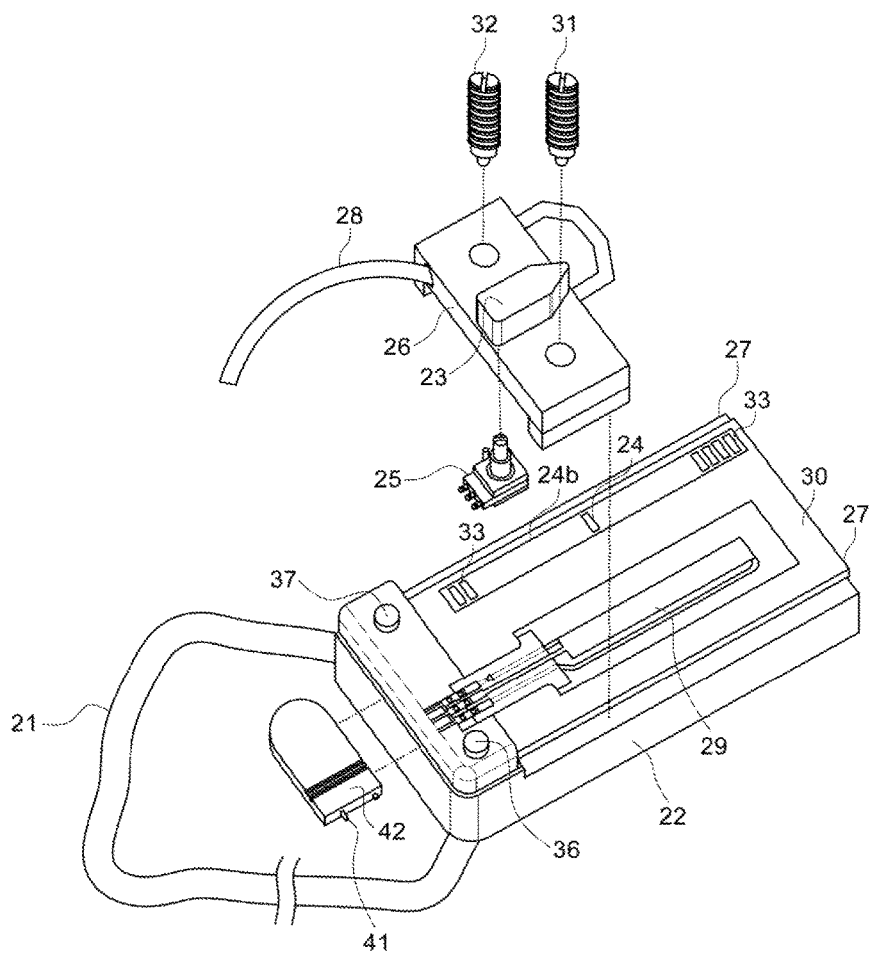
FIG. 10—Exploded View of Wearable Wireless Controller.

FIG. 10 shows a wireless controller provided to operate the boat. Even though it is called a Wearable System Controller, it can be mounted on the boat in a fixed position. It has a footprint the size of an iPhone and is usually worn with a lanyard 51 suspended from one's neck. So it's a little watertight box (housing) 22 to house the electronics with a knob 23 on it. In this configuration, the sliding potentiometer 29 is mounted on the external surface of the housing 22 while the wiper 31 is mounted on the lower surface of the slider 26.

For steering and speed control, only the NAV Knob is used. The knob is shaped like a boat to make it more intuitive. In Neutral, the NAV Knob 23 is in the middle of the Controller marked by a detent 24 which one can feel in the middle of the Feeler Strip 24b (see FIG. 10). To go forward, slide the NAV Knob forward. The further one slides the NAV Knob, the faster the boat goes. If one wants to make a turn simultaneously, simply turn the NAV Knob in the desired direction. Steering and speed control in reverse is similar except that one pulls the NAV knob back from the Neutral Detent.

The NAV Knob 23 is directly mounted on the shaft of a 5 k ohm rotary, waterproof to IP67 potentiometer 25 with 320 degrees of rotation (this offers lots of resolution). This rotary potentiometer is mounted on a sliding carriage 26 (we simply call it a Slider). The Slider 26 slides in one or more grooves 27 formed into the external surface of the housing 22 of the Wearable System Control Box. A short, flexible wire 28 may be used to connect the rotary potentiometer to the rest of electronics in the Controller box. A sliding potentiometer, called a SoftPot strip 29 is actually glued to the Wearable System Control box external surface 30 under the Slider carriage. As one slides the Slider, it has a Delrin wiper 31 on the underside of the carriage that always presses against the SoftPot strip which causes the SoftPot to act as a waterproof sliding potentiometer which controls the speed of the boat either forward or in reverse depending on which side of the Neutral detent the slide is located. The detent is a groove in the Feeler Strip under a second Delrin wiper 32. The FeelerStrip gets its name because it is also used to sense when the motors are operating inefficiently too fast in forward or reverse. The Delrin wiper will make the sliding action feel rougher as it goes across tiny speed bumps 33 in the FeelerStrip that mark this zone—this is tactile feedback. (See FIG. 10.)

The SoftPot is about 2 inches long which gives substantial resolution for resolving forward and reverse speed.

Figure 10A:
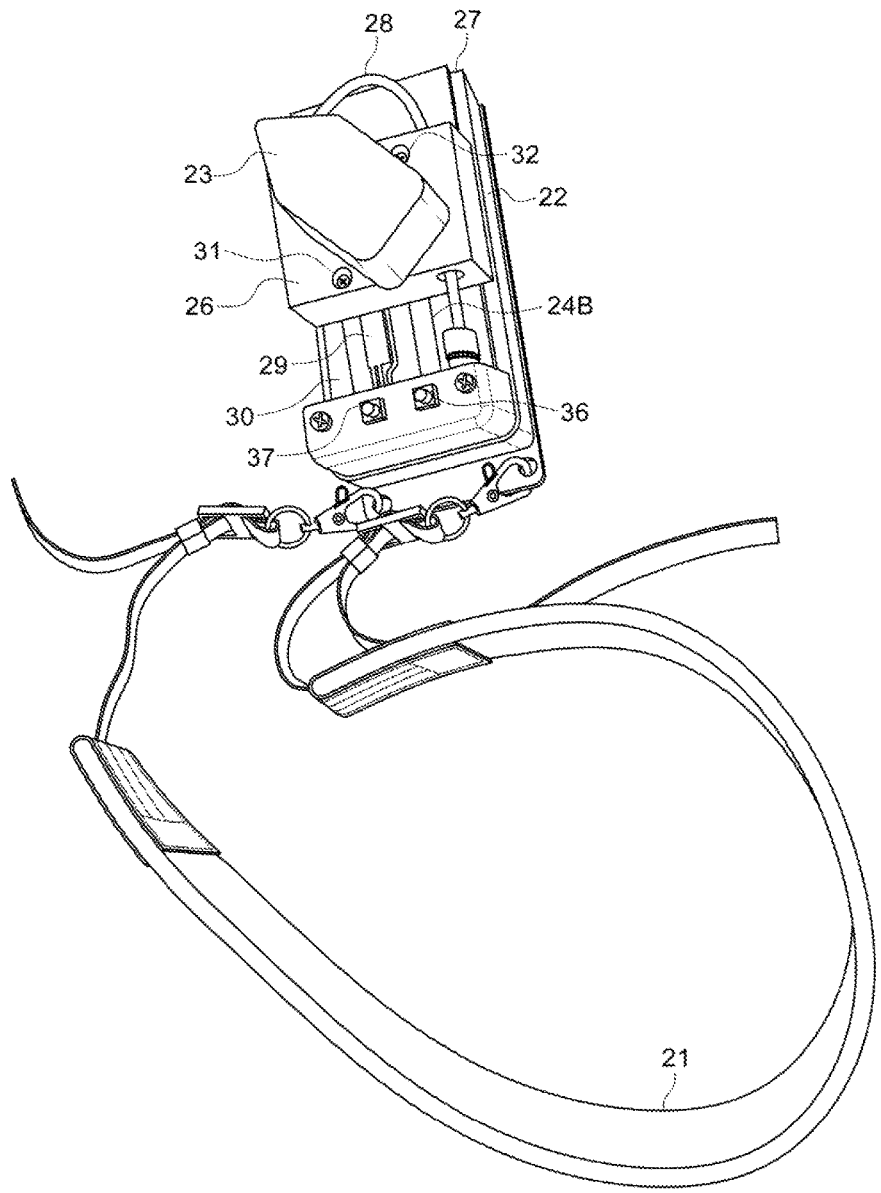
FIG. 10A—View of Wearable Wireless Controller With Slider Cutout.

FIG. 10A shows the wireless controller fully assembled, with a cutout in the housing to show internal structures. Also shown is a version of the lanyard 51 that is attached to the device and which floats, thereby keeping the device from sinking.

Figure 10B:
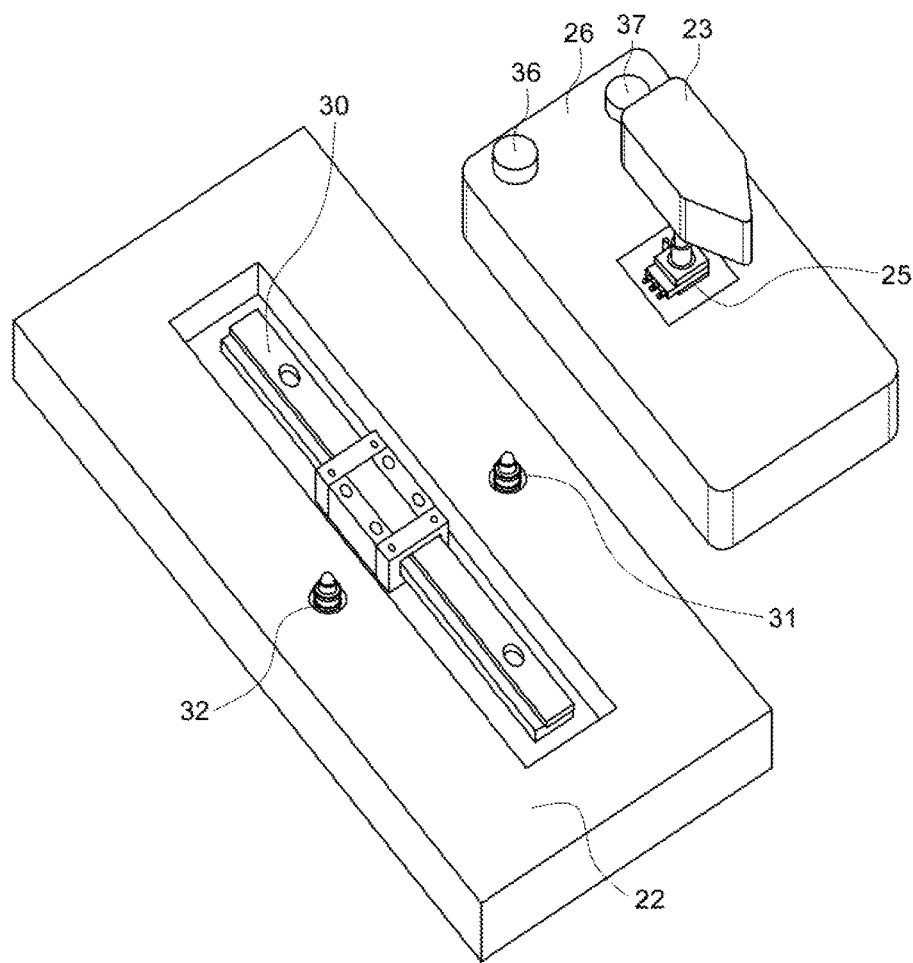
FIG. 10B—Exploded View of Alternate Embodiment of Wireless Controller, showing both top surface of slider and lower surface of slider.
Figure 10C:
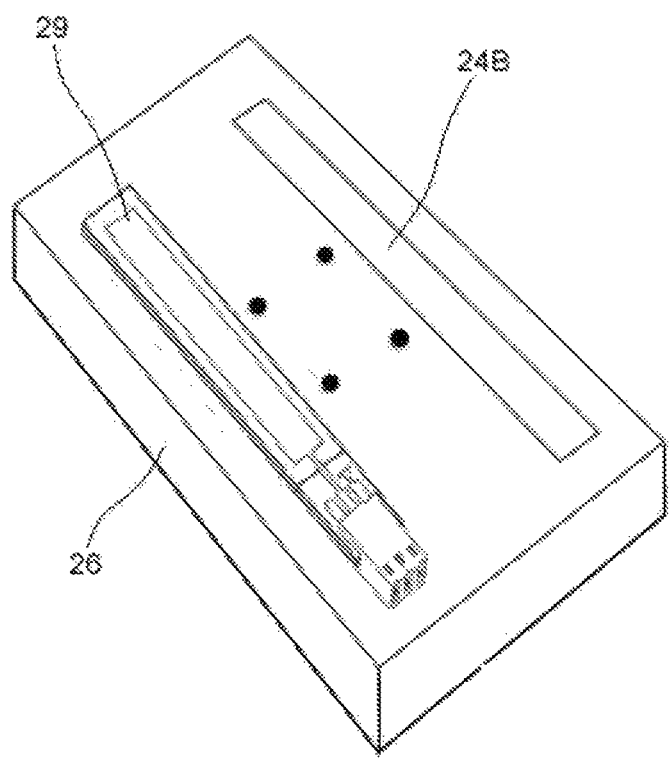

FIG. 10B shows an exploded view of an alternative embodiment of the device. In this alternative, the sliding potentiometer 29 is mounted on the lower surface of the slider 26 while the wiper 31 is mounted on the external surface 30 of the housing 22.

Figure 11:
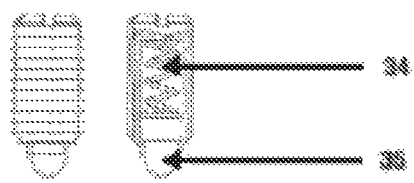
FIG. 11—Shows components of delrin ball wiper.

FIG. 11 illustrates friction cruise control. Friction is provided to the Slider by a spring 34 that pushes the delrin ball 35 down. This force is adjustable by screwing the delrin ball assembly down. The friction is supplied to the shaft of the rotary potentiometer by the IP67 waterproof seal around it. Simply leave the NAV Knob in its last position. To change speed and/or direction move/rotate the NAV Knob from its last position. This is superior to the electronic cruise control lock feature described in the closest, similar patent (engaging and disengaging the lock of a joystick would bump its position a little translating to a bump in boat motion).

The Wearable System Controller has additional features designed specifically to aid fishermen or photographers. While the boat is in Neutral, the Spin buttons can momentarily spin the boat either CW or CCW the CW Button 36 or CCW Button 37 is being pushed (see FIG. 10). These momentary switches on the case are membrane style and waterproof. They are connected to the rest of the electronics in the Control box.

Figure 12:
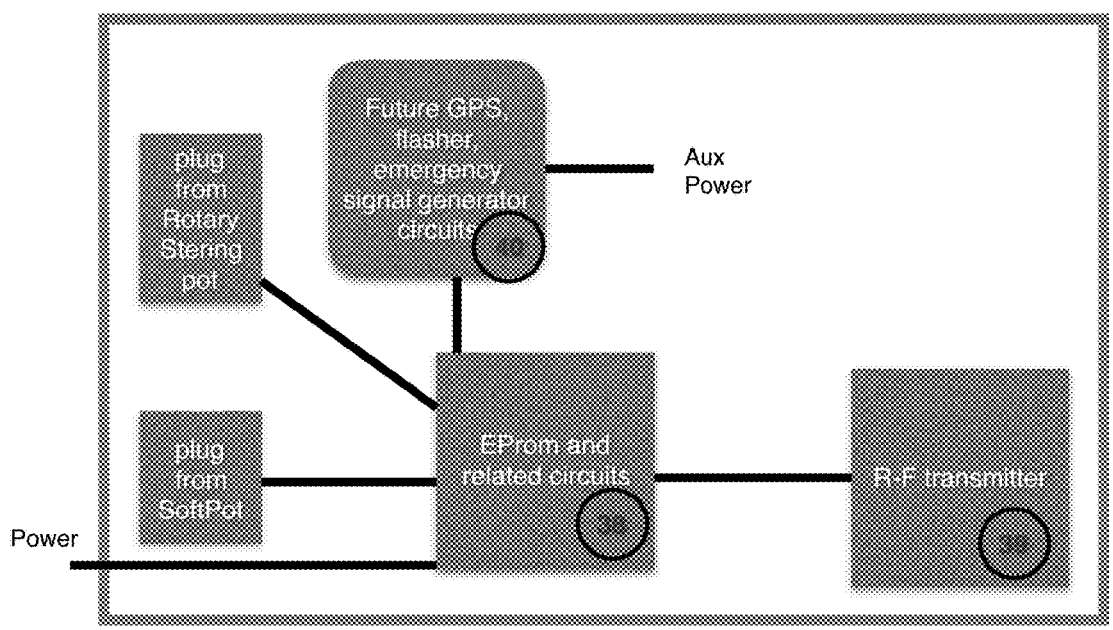
FIG. 12—Shows electronics inside Wearable System Controller Box.

FIG. 12 shows the rest of the electronics in the Control box, including an eProm 38 that senses the positions of the potentiometers and translates this to how the motors should be controlled. The eProm sends the pulse information to the Pulse Width Modulation boards in the Main System Mount via a wireless, radio frequency transmitter 39. Future electronics 40 include an emergency strobe/flasher, gps, homing signal generator, etc.

The power on/off switch 41 of the Wearable System Controller can be used to instantly disengage motor control (see FIG. 10). When turned back on, the last motor control motions are resumed. The switch is part of a small battery case 42 which is attached externally to the upper part of the Control box (covered by a soft flexible film to allow the switch to be used). The battery case is external since it should be easy to change out the battery without having to open the watertight Control box. In the future the following additional buttons for the Wearable System Controller may be used to activate the future features of emergency strobe/flasher, gps, homing signal generator, etc.

The most unique part of the Propulsion System is the Wearable System Controller. It uses a single knob, the NAV Knob, to control all Navigation movements with a large resolution range for both steering and throttle. This range enables us to program many more motor commands than has been possible before. In fact, experimentation determined what motor commands were necessary and found some were not intuitive or described by others. The steering logic controls the dual motors in more ways than other patents describe, thus the present invention offers more complete and smooth control.

The physical control of the Wearable System Controller is fully analog, which also contributes to smoothness of control. This is more understandable to the user and results in a smoother boat operation compared to a button pushing user interface.

For boat control, the boat shaped knob, the NAV Knob, adds to the intuitiveness of the user interface.

The Wearable System Controller is not limited to just this electrical motor propulsion system for boats. It will be useful for controlling aircraft, ground vehicles, etc.

The Wearable System Controller can be mounted in more traditional ways such as on a piece of equipment. It is, in general, an x,y motion controller that can be used in many different applications other than dual prop boat control. It can be used to replace and improve upon many uses of a joystick, especially when control of a first axis is desired while changing values in a second axis. The Wearable System Controller also offers substantially more resolution along each axis.

The Wearable System Controller provides separate level control of the forward/reverse (Speed Setting) function and a left/right torsional function (Left/Right Steering). A joystick locks these functions together. The joystick can be spring-return to center or spring-less and allow the control lever to remain stationary. But the Fwd/Rev and Left/Right steering are still locked together. There is no way to separate these functions when using a joystick. However, for smooth directional and speed control, these functions should be separately controlled. Therefore, a joystick design is less than optimal.

In operation, the processor reads the resistance values from both potentiometers. Then a program interprets what it should do based on those resistance values. The program can be written in many different ways. The program space for the microprocessor is a clean slate open to imagination. In the case of the preferred implementation a neutral point is defined almost midway in the turn of the rotary pot. Another neutral point is defined almost midway on the slider pot. The program knows what range of resistances define the neutral points. It also knows that when the user is decreasing resistance from the neutral point, and when the user is increasing resistance from the neutral point. It knows then what instructions to issue to the DC motors (although the invention is not limited to DC motors). The program can offer different types of instructions as it reads resistances from the potentiometers.

Potentiometers don't need defined central neutral points (neutral can be at the end of one of the resistance ranges). It depends on what someone wants to do with the Wearable Controller. It is completely programmable per application needs.

The Wearable Controller can do more than a joystick can do. For instance, it is easier for a users to hold x constant while changing y. The point is that whatever a joystick based controller can do, the Wearable Controller can do (and some things even better). Joystick controllers are in widespread use. Hence, there is no reason why the Wearable Controller cannot be used in the same applications, with increased benefits. For instance, in live video recording, a moving mount for a camera is needed that can accurately hold one axis constant while moving in another axis. For more details on this see http://support.dynamicperception.com/hc/en-us/articles/201809500-AT2-Motion-Controller-User-Guide. This would be a perfect application for the Wearable Controller.

Most robots are controlled through joysticks, but it has been found that people are very inefficient when controlling a robot arm with a joystick because the mapping of the different buttons and axes of joysticks are often unintuitive. http://www.bbc.com/future/story/20141212-press-x-press-y-fire-laser Since each axis of a Wearable Controller is more distinct and understandable to the user, robotic designers may find beneficial ways of using the Wearable Controller.

For drones, two joysticks are used side by side on the same controller. The most popular program is where the left stick controls Throttle and Yaw and the right stick controls Pitch and Roll.

Having a console with two of Wearable Controllers (WC) side by side may be more intuitive than joysticks. One WC can be used for controlling Throttle and Yaw. Pushing the knob ahead on the slider can provide throttle functionality. The twisting the knob can represent the amount of yaw (describes the rotation of a drone around it's center axis and therefore controls which direction the quadcopter is facing).

Pitch describes the angle of flight along an axis and controls which end of the quadcopter that moves higher. Roll is the term for rotation along an axis and provides a side to side motion. So the slider may intuitively define pitch while the rotating knob defines the amount of roll.

Mounting and removing motors is done in one action with simultaneous physical and electrical attachment. There is no possibility of crossing wires. The Motor Stubs allow usage of a wide range of existing trolling motors.

The fastening system of the Main System Mount to boats is very strong and is insensitive to various boat hull designs. It is also easily removed, although it can remain attached to a boat even if the motors and battery are removed. The Main System Mount houses all wiring except the one to the battery.

The modularity of the Propulsion System makes transportation and setup simpler and takes less strength than installing an all-in-one solution.

The optional, higher voltage, 14.8 v battery, is unique for using common 12 v trolling motors as part of the propulsion system. This new battery improves boat speed by up to 30 percent (depending on boat length and the maximum attainable hull speed). And yet, the increased voltage of 14.8 v is not high enough to cause damage to 12 v trolling motors.

Cruise control is straight forward and simple.

The pulse width modulation feature can handle a very wide range of motors—up to 55 amps per motor, up to 30 v (with slight revision). The program features soft ramp of motor commands that might cause undue stress on the boat. This soft ramp feature is provided by PWM vendors who also program the eProm with the motor control logic of the present invention.

Description of Steering Logic:

Following is the steering logic control for the control of a watercraft in one embodiment of invention, whereby the watercraft has two motors, one mounted on the left side and one mounted on the right side:

1. LOW rpm setting—forward:

NAV knob is set in neutral position, the slider is moved slightly forward of the neutral point. Both motors' propellers rotate in a forward direction at the same speed.

2. LOW rpm setting—forward, right turn:

NAV knob is rotated slightly to the right of the neutral position, the slider is moved slightly forward of the neutral point. The right motor decreases its speed relative to the left motor's speed; both motors continue to rotate in a forward direction.

As the NAV knob is rotated further to the right of the neutral position (at some predetermined $X_1°$ of rotation), the right motor decreases its speed to zero while the left motor continues to rotate in a constant forward direction.

As the NAV knob is rotated yet further to the right of the neutral position (at some $Y°$ of rotation, $Y°>X_1°$), the right motor begins to rotate in the reverse direction while the left motor continues to rotate in a constant forward direction. The greater the continued rotation of the NAV knob, the faster the speed of the right motor.

In all of the above settings, the slider also may be moved forward slightly, increasing the forward speed somewhat; in such cases, the speed of rotation of both motors increases proportionally. However, for very sharp turns (where the NAV knob is rotated more than some predetermined $Z°$ of rotation, $Z°>Y°$, beyond the neutral position), the rotation speed of the right motor's propeller remains constant and the left motor increases it speed in the forward direction as the slider is moved forward.

3. LOW rpm setting—forward, left turn:

The NAV knob is rotated to the left of the neutral position and the operation of the motors is the same as for a right turn, but in reverse.

4. MID rpm setting—forward, right turn:

The slider is moved substantially further forward of the neutral point. The operation of the motors is the same as for a low speed right turn, except that the speed of the rotation of the propeller of the right motor decreases at a slower rate, such that it continues to operate in a forward direction until the NAV knob is rotated to some predetermined $X_2°$ beyond the neutral position ($X_2°>X_1°$), at which point rotation of the propeller of the right motor stops.

As the NAV knob is rotated further to the right of the neutral position (beyond $X_2°$), the right motor begins to rotate in the reverse direction while the left motor continues to rotate in a constant forward direction. The greater the continued rotation of the NAV knob, the faster the speed of the right motor.

5. MID rpm setting—forward, left turn:

The NAV knob is rotated to the left of the neutral position and the operation of the motors is the same as for a right turn, but in reverse.

6. HIGH rpm setting—forward, right turn:

The slider is moved forward of the neutral point almost to the extent of its travel. The operation of the motors is the same as for a low speed right turn, except that the speed of the rotation of the propeller of the right motor decreases at an even a slower rate, such that it continues to operate in a forward direction until the NAV knob is rotated to some predetermined $X_3°$ ($X_3°>X_2$) beyond the neutral position, at which point rotation of the propeller of the right motor stops.

As the NAV knob is rotated further to the right of the neutral position (beyond $X_3°$), the right motor begins to rotate in the reverse direction while the left motor continues to rotate in a constant forward direction. The greater the continued rotation of the NAV knob, the faster the speed of the right motor.

7. HIGH rpm setting—forward, left turn:

The NAV knob is rotated to the left of the neutral point and the operation of the motors is the same as for a right turn, but in reverse.

8. LOW rpm setting—reverse:

NAV knob is set in the neutral position, the slider is moved slightly rearward of the neutral point. Both motors' propellers rotate in a reverse direction at the same speed.

9. Reverse, right turn:

NAV knob is rotated slightly to the left, the slider is moved slightly rearward of the neutral position. The right motor decreases its speed relative to the left motor's speed; both motors continue to rotate in a reverse direction. This orients the front end of the watercraft to the left and moves the back end of the watercraft to the right.

As the NAV knob is rotated further to the left of the neutral position, the right motor decreases its speed to zero while the left motor continues to rotate in a constant reverse direction.

If the slider is moved further rearward from the neutral position without further rotating the NAV knob, the left motor's speed increases, with the right motor's propeller continuing to rotate at the same speed.

10. Reverse, left turn:

The NAV knob is rotated to the right of the neutral point and the operation of the motors is the same as for a right turn, but in reverse. This orients the front end of the watercraft to the right and moves the back end of the watercraft to the left.

11. Clockwise pivot-in-place:

The slider is moved to the neutral point and the CW momentary switch is pushed, causing the right motor to run at full speed in the reverse direction while the left motor's propeller does not rotate. (The position of the NAV knob is not taken into account during this operation.)

12. Counterclockwise pivot-in-place:

The slider is moved to the neutral point and the CCW momentary switch is pushed, causing the left motor to run at full speed in the reverse direction while the right motor's propeller does not rotate. (The position of the NAV knob is not taken into account during this operation.)

Modifications and variations can be made to the disclosed embodiments of the present invention without departing from the subject or spirit of the invention as defined in the following claims.

I claim:

1. A wireless controller for use with a device, said device having a controllable first feature and a controllable second feature, wherein the controllable first feature of the device is a variable speed of movement of the device through three-dimensional space, and the controllable second feature of the device is a variable direction of movement of the device through three-dimensional space;

said controller being configured to control the controllable first feature of said device and configured to control the controllable second feature of said device, said controller having a housing, a rotary potentiometer, a sliding potentiometer, a slider, a wiper, a knob, a microprocessor, a signal transmitter, a power supply, and an on/off switch;

wherein said housing is a watertight box having an external surface, with the slider located on the external surface of the housing;

the rotary potentiometer is a rotatable mechanism which linearly changes resistance of an electrical current passing therethrough depending on a relative angle of rotation from a neutral position, such that changing the angle of rotation changes the level of resistance, with the resistance changing in a known manner corresponding to a known amount of rotation of the rotatable mechanism;

the sliding potentiometer is a strip which linearly changes resistance of an electrical current passing therethrough depending on a relative location of an indicator mechanism along said strip, such that changing the location of the indicator mechanism changes the level of resistance, with the resistance changing in a known manner corresponding to a known location of the indicator mechanism;

the slider is slidably engaged with the external surface of the housing such that said slider is moveable forward and backward along a longitudinal axis of the housing, with said slider having a lower surface spaced apart from the external surface of the housing, said slider having the rotary potentiometer integrated therewith, said wiper being in contact with the strip of the sliding potentiometer and acting as the indicator mechanism for said strip such that movement of said slider causes said wiper to contact said sliding potentiometer at various locations along said strip;

the knob is suitably configured for grasping with a human hand and is affixed to a top portion of the rotatable mechanism of the rotary potentiometer located above a top surface of the slider, such that movement of the knob in either a clockwise or counterclockwise direction causes the rotatable mechanism of the rotary potentiometer to rotate in a corresponding direction, and movement of the knob in either a forward or rearward direction causes the slider to move in a corresponding direction relative to the housing, with movement of the knob in either the forward or rearward direction occurring either independently of or simultaneously with movement of the knob in either the clockwise or counterclockwise direction, and with movement of the knob in either the clockwise or counterclockwise direction occurring either independently of or simultaneously with movement of the knob in either the forward or rearward direction;

the microprocessor is in connection with the rotary potentiometer and with the sliding potentiometer and measures the resistances of electrical currents established by the relative positions of the rotary potentiometer and the sliding potentiometer, said resistances converted by the microprocessor into control values suitable for directing the controllable first feature of the device and directing the controllable second feature of the device;

the signal transmitter is in connection with the microprocessor and is capable of transmitting signals representing the control values to a signal receiver in connection with the device;

the power supply is in connection with the rotary potentiometer, the sliding potentiometer, the microprocessor, the signal transmitter, and the on/off switch, said power supply suitably configured to provide electrical current to the rotary potentiometer, the sliding potentiometer, the microprocessor, and the signal transmitter; and the on/off switch is suitably configured for manipulation by a human hand, said on/off switch being configured to allow the power supply to provide electrical current to the rotary potentiometer, the sliding potentiometer, the microprocessor, and the signal transmitter when toggled to an operable or "on" mode, and said on/off switch being configured to prevent the power supply from providing electrical current to the rotary potentiometer, the sliding potentiometer, the microprocessor, or the signal transmitter when toggled to an inoperable or "off" mode;

whereby the controller is used to control the controllable first feature of the device and to control the controllable second feature of the device by creating control values based on the relative positions of the knob and slider as established by a user and transmitting those control values to the device.

2. The wireless controller of claim 1 wherein the sliding potentiometer is a thin strip which linearly changes resistance of an electrical current depending on where along said strip pressure is applied, such that pressure applied at various points on said strip from a first end of said strip to an opposite second end of said strip results in varied levels of resistance, with a level of resistance resulting from pressure applied at a location on said strip closer to the second end of said strip being greater than a level of resistance resulting from pressure applied at a location on said strip closer to the first end of said strip, with the resistance changing in a known manner corresponding to a known location of applied pressure to said strip.

3. The wireless controller of claim 1 wherein the microprocessor is in wireless connection with the rotary potentiometer.

4. The wireless controller of claim 1 wherein the microprocessor is in wired connection with the rotary potentiometer.

5. The wireless controller of claim 1 wherein the microprocessor is in wireless connection with the sliding potentiometer.

6. The wireless controller of claim 1 wherein the microprocessor is in wired connection with the sliding potentiometer.

7. The wireless controller of claim 1 wherein said housing has a hollow interior, with the microprocessor and signal transmitter located within the hollow interior of the housing.

8. The wireless controller of claim 1 wherein the sliding potentiometer is located on the external surface of the housing proximate to the slider.

9. The wireless controller of claim 8 wherein the wiper extends from the lower surface of the slider, such that movement of the slider causes the wiper to move and contact the sliding potentiometer at various points along the sliding potentiometer.

10. The wireless controller of claim 1 wherein the sliding potentiometer is located on the lower surface of the slider.

11. The wireless controller of claim 10 wherein the wiper extends from the external surface of the housing towards the lower surface of the slider, such that movement of the slider causes the sliding potentiometer to move and contact the wiper at various points along the sliding potentiometer.

12. The wireless controller of claim 1 wherein the power supply is located within a hollow interior of the housing.

13. The wireless controller of claim 1 wherein the power supply is located within a watertight compartment attached to the housing.

14. The wireless controller of claim 1 wherein the power supply is comprised of two or more sub-power supplies, with each of the rotary potentiometer, the sliding potentiometer, the microprocessor, the signal transmitter, and the on/off switch being in connection with at least one of the two or more sub-power supplies.

15. The wireless controller of claim 1 wherein the power supply is located within a hollow interior of the slider.

16. The wireless controller of claim 1 wherein the housing further comprises an indicator means located on the external surface of the housing, and the slider further comprises an indicator engagement member extending from the lower surface of the slider, wherein said indicator means comprises one or more structures, and the indicator engagement member is configured to engage with the one or more structures of the indicator means as the slider is moved over said one or more structures, with said engagement of the indicator engagement member with said one or more structures being perceptible to the user moving said slider.

17. The wireless controller of claim 16 wherein at least one of the one or more structures of the indicator means is a neutral indication structure located at a position on the external surface of the housing correlating to a designated neutral point of travel of the slider along the external surface of the housing, whereby when the user perceives the indicator engagement member engaging with said neutral indication structure the user is alerted to the fact that the slider is positioned at the designated neutral point of travel along the external surface of the housing.

18. The wireless controller of claim 17 wherein the neutral indication structure is a detent.

19. The wireless controller of claim 16 wherein each of the one or more structures of the indicator means is a detent.

20. The wireless controller of claim 1 wherein the slider further comprises an indicator means located on the lower surface of the slider, and the housing further comprises an indicator engagement member extending from the external surface of the housing, wherein said indicator means comprises one or more structures, and the indicator engagement member is configured to engage with the one or more structures of the indicator means as the slider is moved over said indicator engagement member, with said engagement of the indicator engagement member with said one or more structures being perceptible to the user moving said slider.

21. The wireless controller of claim 20 wherein at least one of the one or more structures of the indicator means is a neutral indication structure located at a position on the lower surface of the slider correlating to a designated neutral point of travel of the slider along the external surface of the housing, whereby when the user perceives the indicator engagement member engaging with said neutral indication structure the user is alerted to the fact that the slider is positioned at the designated neutral point of travel along the external surface of the housing.

22. The wireless controller of claim 21 wherein the neutral indication structure is a detent.

23. The wireless controller of claim 20 wherein each of the one or more structures of the indicator means is a detent.

24. The wireless controller of claim 1 whereby the housing of the wireless controller floats,
whereby when the wireless controller is immersed in water the housing of the wireless controller keeps the wireless controller proximate to the water's surface.

25. The wireless controller of claim 1 further comprising a lanyard, said lanyard being attached to the housing.

26. The wireless controller of claim 25 whereby the lanyard floats,
whereby when the wireless controller is immersed in water the lanyard keeps the wireless controller proximate to the water's surface.

27. The wireless controller of claim 1 wherein frictional forces maintain the slider in the position last set by the user whenever the slider is not being moved by the user, and frictional forces maintain the knob in its rotational orientation last set by the user whenever the knob is not being rotated by the user.

28. The wireless controller of claim 1 wherein the device is a vehicle, said vehicle having a front end, a rear end, and a propulsion system, and the controllable first feature of the device is the variable speed of movement of the vehicle and the controllable second feature of the device is the variable direction of movement of the vehicle;
with the microprocessor capable of creating control values suitable for directing the speed and direction of the vehicle; and
the signal receiver is in connection with the propulsion system of the vehicle;
whereby the controller is used to direct the movement of the vehicle in a forward direction, a rearward direction, a leftward direction, and a rightward direction and to control the speed of the vehicle by creating control values based on the relative positions of the knob and slider as established by a user and transmitting those control values to the propulsion system of the vehicle via the signal receiver.

29. The wireless controller of claim 28 whereby
movement of the slider in a forward direction along the external surface of the housing beyond a designated neutral point of travel of the slider results in the vehicle being moved in a forward direction, and the farther forward the slider is moved in a forward direction the faster the speed of the vehicle;
movement of the slider in a backward direction along the external surface of the housing beyond the designated neutral point of travel of the slider results in the vehicle being moved in a reverse direction, and the farther backward the slider is moved in a backward direction the faster the speed of the vehicle;
movement of the knob in a clockwise direction beyond a designated neutral point of rotation when the slider is positioned forward of the designated neutral point of travel results in the front end of the vehicle being turned to the right of a longitudinal axis of the vehicle, and the farther the knob is moved in a clockwise direction beyond the designated neutral point of rotation the sharper the front end of the vehicle is turned to the right;
movement of the knob in a clockwise direction beyond the designated neutral point of rotation when the slider is positioned backward from the designated neutral point of travel results in the rear end of the vehicle being turned to the left of the longitudinal axis of the vehicle, and the farther the knob is moved in a clockwise direction beyond the designated neutral point of rotation the sharper the rear end of the vehicle is turned to the left;
movement of the knob in a counterclockwise direction beyond the designated neutral point of rotation when the slider is positioned forward of the designated neutral point of travel results in the front end of the vehicle being turned to the left of the longitudinal axis of the vehicle, and the farther the knob is moved in a counterclockwise direction beyond the designated neutral point of rotation the sharper the front end of the vehicle is turned to the left; and
movement of the knob in a counterclockwise direction beyond the designated neutral point of rotation when the slider is positioned backward from the designated neutral point of travel results in the rear end of the vehicle being turned to the right of the longitudinal axis of the vehicle, and the farther the knob is moved in a counterclockwise direction beyond the designated neutral point of rotation the sharper the rear end of the vehicle is turned to the right.

30. The wireless controller of claim 28 further comprising a clockwise rotation switch, wherein the clockwise rotation switch is suitably configured for manipulation by a human hand, said clockwise rotation is located on the housing and is in connection with the microprocessor and the power supply,
whereby when the clockwise rotation switch is activated the microprocessor creates a clockwise rotation control value which is then sent by the signal transmitter to the propulsion system of the vehicle via the signal receiver, thereby causing the vehicle to be rotated in a clockwise direction.

31. The wireless controller of claim 28 further comprising a counterclockwise rotation switch, wherein the counterclockwise rotation switch is suitably configured for manipulation by a human hand, said counterclockwise rotation is located on the housing and is in connection with the microprocessor and the power supply,
whereby when the clockwise rotation switch is activated the microprocessor creates a counterclockwise rotation control value which is then sent by the signal transmitter to the propulsion system of the vehicle via the signal receiver, thereby causing the vehicle to be rotated in a counterclockwise direction.

32. The wireless controller of claim 28 being suitably configured to be affixed to a surface of the vehicle.

33. The wireless controller of claim 28 wherein the propulsion system of the vehicle is located at the rear end of the vehicle.

34. The wireless controller of claim 28 wherein the vehicle for which said wireless controller is used is a watercraft, said watercraft having a stern and a bow, with said propulsion system of said vehicle comprising a port side motor and a starboard side motor, with each said motor being electrically powered and having a propeller capable of rotating in both a forward direction and in a reverse direction at various speeds, said controller being capable of controlling the speed and direction of rotation of the port side motor and the speed and direction of rotation of the starboard side motor, with the microprocessor of said controller generating control values suitable for directing the speed and rotation of the propellers of the motors of the watercraft, and the signal receiver being in connection with the motors of the watercraft;

whereby the controller is used to direct the movement of the watercraft and to control the speed of the watercraft by transmitting said control values to the port side motor and the starboard side motor of the propulsion system of the watercraft via the signal receiver to effect the operation of one or both of the port side motor and the starboard side motor, said motors operating with the same or different speed of rotation of the respective propellers of the motors and with the same or different direction of rotation of the respective propellers of the motors to achieve the desired movement of the watercraft.

35. The wireless controller of claim 34 further comprising a clockwise rotation switch, wherein the clockwise rotation switch is suitably configured for manipulation by a human hand, said clockwise rotation is located on the housing and is in connection with the microprocessor and the power supply, whereby when the clockwise rotation switch is activated the microprocessor creates a clockwise rotation control value which is then sent by the signal transmitter to the motors of the propulsion system of the watercraft via the signal receiver such that the propeller of the port side motor does not rotate and the propeller of the starboard side motor rotates in a reverse direction at substantially maximum speed, thereby rotating the watercraft in a clockwise direction.

36. The wireless controller of claim 34 further comprising a counterclockwise rotation switch, wherein the counterclockwise rotation switch is suitably configured for manipulation by a human hand, said counterclockwise rotation is located on the housing and is in connection with the microprocessor and the power supply, when the counterclockwise rotation switch is activated the microprocessor creates a counterclockwise rotation control value which is then sent by the signal transmitter to the motors of the propulsion system of the watercraft via the signal receiver such that the propeller of the starboard side motor does not rotate and the propeller of the port side motor rotates in a reverse direction at substantially maximum speed, thereby rotating the watercraft in a counterclockwise direction.

37. The wireless controller of claim 34 being suitably configured to be affixed to a surface of the watercraft.

38. The wireless controller of claim 34 wherein the propulsion system of the vehicle is located at the stern of said watercraft.

* * * * *